United States Patent
Haas

(10) Patent No.: US 8,192,147 B2
(45) Date of Patent: Jun. 5, 2012

(54) NACELLE ASSEMBLY HAVING INLET BLEED

(75) Inventor: Martin Haas, Columbia, CT (US)

(73) Assignee: United Technologies Corporation, Hartford, CT (US)

(*) Notice: Subject to any disclaimer, the term of this patent is extended or adjusted under 35 U.S.C. 154(b) by 1131 days.

(21) Appl. No.: 11/956,372

(22) Filed: Dec. 14, 2007

(65) Prior Publication Data

US 2009/0155046 A1 Jun. 18, 2009

(51) Int. Cl.
*F01D 13/02* (2006.01)
(52) U.S. Cl. .......................... 415/144; 415/175
(58) Field of Classification Search .............. 415/115, 415/116, 144, 175, 119
See application file for complete search history.

(56) References Cited

U.S. PATENT DOCUMENTS

| | | |
|---|---|---|
| 2,948,111 A | 5/1955 | Nelson |
| 2,915,262 A | 12/1959 | Klein |
| 3,059,878 A | 10/1962 | Kerry et al. |
| 3,074,232 A | 1/1963 | Soyer |
| 3,119,581 A | 1/1964 | Trevaskis |
| 3,222,863 A | 12/1965 | Klees et al. |
| 3,298,637 A | 1/1967 | Sho-Tang |
| 3,422,624 A | 1/1969 | Brooks et al. |
| 3,524,611 A | 8/1970 | Frank |
| 3,532,100 A | 10/1970 | Hilton |
| 3,541,794 A | 11/1970 | Johnston et al. |
| 3,568,694 A | 3/1971 | Johnson |
| 3,575,259 A | 4/1971 | Wilkinson |
| 3,583,417 A | 6/1971 | Clark |
| 3,611,724 A | 10/1971 | Kutney |
| 3,618,699 A | 11/1971 | Evans |
| 3,623,328 A | 11/1971 | Pike |
| 3,623,494 A | 11/1971 | Poucher |
| 3,652,036 A | 3/1972 | Sans et al. |
| 3,662,556 A | 5/1972 | Poucher et al. |
| 3,664,612 A | 5/1972 | Skidmore et al. |
| 3,699,682 A | 10/1972 | Kleckner |
| 3,736,750 A | 6/1973 | Britt |
| 3,763,874 A | 10/1973 | Wilde et al. |
| 3,770,228 A | 11/1973 | Traksel et al. |

(Continued)

FOREIGN PATENT DOCUMENTS

EP 0516468 12/1992

(Continued)

OTHER PUBLICATIONS

U.S. Appl. No. 11/595,040, filed Nov. 10, 2006—Winter, et al., entitled "Gas Turbine Engine Providing Simulated Boundary Layer Thickness Increase".

(Continued)

*Primary Examiner* — Edward Look
*Assistant Examiner* — Dwayne J White
(74) *Attorney, Agent, or Firm* — Carlson Gaskey & Olds P.C.

(57) ABSTRACT

A nacelle assembly for a turbine engine has a cowl. The cowl extends along an axis and has an exterior surface spaced from an interior surface. The interior surface forms an air inlet for directing airflow to the turbine engine. An opening is disposed on the cowl. A device for creating suction through the opening is in fluid communication with the opening. The opening removes a portion of a boundary layer flow through the cowl, thereby providing higher energy flow along the interior surface.

17 Claims, 2 Drawing Sheets

U.S. PATENT DOCUMENTS

| | | | |
|---|---|---|---|
| 3,905,566 A | 9/1975 | Anderson | |
| 4,007,891 A | 2/1977 | Sorensen | |
| 4,012,013 A | 3/1977 | Ball et al. | |
| 4,044,973 A | 8/1977 | Moorehead | |
| 4,083,181 A | 4/1978 | Adamson | |
| 4,132,240 A | 1/1979 | Frantz | |
| 4,147,029 A | 4/1979 | Sargisson | |
| 4,154,256 A | 5/1979 | Miller | |
| 4,199,295 A | 4/1980 | Raffy et al. | |
| 4,220,171 A | 9/1980 | Ruehr et al. | |
| 4,475,702 A | 10/1984 | Cole | |
| 4,540,143 A | 9/1985 | Wang | |
| 4,722,357 A | 2/1988 | Wynosky | |
| 4,738,416 A | 4/1988 | Birbragher | |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,014,933 A | 5/1991 | Harm et al. | |
| 5,058,617 A | 10/1991 | Stockman et al. | |
| 5,127,222 A | 7/1992 | Ream et al. | |
| 5,141,182 A | 8/1992 | Coffinberry | |
| 5,143,329 A | 9/1992 | Coffinberry | |
| 5,145,126 A | 9/1992 | Patilla | |
| 5,156,362 A | 10/1992 | Leon | |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,357,742 A | 10/1994 | Miller | |
| 5,361,828 A | 11/1994 | Lee | |
| 5,447,283 A | 9/1995 | Tindell | |
| 5,568,724 A | 10/1996 | Lindner et al. | |
| 5,586,431 A | 12/1996 | Thonebe et al. | |
| 5,593,112 A | 1/1997 | Maier et al. | |
| 5,725,182 A | 3/1998 | Valleroy | |
| 5,727,380 A | 3/1998 | Lardy et al. | |
| 5,732,547 A | 3/1998 | Olsen et al. | |
| 5,743,488 A | 4/1998 | Rolston et al. | |
| 5,803,410 A | 9/1998 | Hwang | |
| 5,813,625 A | 9/1998 | Hassan et al. | |
| 5,841,079 A | 11/1998 | Parente | |
| 5,934,611 A | 8/1999 | Tindell et al. | |
| 5,971,328 A | 10/1999 | Kota | |
| 5,987,880 A | 11/1999 | Culbertson | |
| 6,055,805 A | 5/2000 | El-Aini et al. | |
| 6,089,505 A | 7/2000 | Gruensfelder et al. | |
| 6,109,566 A | 8/2000 | Miller et al. | |
| 6,129,309 A | 10/2000 | Smith et al. | |
| 6,129,311 A | 10/2000 | Welch et al. | |
| 6,170,253 B1 | 1/2001 | Newton | |
| 6,179,251 B1 | 1/2001 | Tindell et al. | |
| 6,231,006 B1 | 5/2001 | Gruensfelder et al. | |
| 6,259,976 B1 | 7/2001 | Lemelson et al. | |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,375,118 B1 | 4/2002 | Kibens et al. | |
| 6,379,110 B1 | 4/2002 | McCormick et al. | |
| 6,390,418 B1 | 5/2002 | McCormick et al. | |
| 6,471,477 B2 | 10/2002 | Hassan et al. | |
| 6,651,929 B2 | 11/2003 | Dionne | |
| 6,655,632 B1 | 12/2003 | Gupta | |
| 6,698,691 B2 | 3/2004 | Porte | |
| 6,708,711 B2 | 3/2004 | Surply et al. | |
| 6,763,651 B2 | 7/2004 | Shmilovich et al. | |
| 6,764,043 B2 | 7/2004 | Sankrithi et al. | |
| 6,793,177 B2 | 9/2004 | Bonutti | |
| 6,971,229 B2 | 12/2005 | Lair | |
| 7,048,229 B2 | 5/2006 | Sanders et al. | |
| 7,048,230 B2 | 5/2006 | Meyer | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,255,309 B2 | 8/2007 | Boldrin et al. | |
| 7,617,670 B2 | 11/2009 | Truax et al. | |
| 7,739,865 B2 | 6/2010 | Prasad et al. | |
| 7,766,280 B2 | 8/2010 | Cloft et al. | |
| 7,802,760 B2 | 9/2010 | Webster | |
| 7,870,721 B2 | 1/2011 | Winter et al. | |
| 2004/0237534 A1 | 12/2004 | Webster et al. | |
| 2005/0060982 A1 | 3/2005 | Mani | |
| 2005/0274103 A1 | 12/2005 | Prasad et al. | |
| 2006/0155432 A1 | 7/2006 | Brown | |
| 2007/0221788 A1 | 9/2007 | Meister | |
| 2008/0092548 A1 | 4/2008 | Morford et al. | |
| 2008/0112799 A1 | 5/2008 | Winter et al. | |
| 2008/0267762 A1 | 10/2008 | Jain et al. | |
| 2008/0283676 A1 | 11/2008 | Jain et al. | |
| 2008/0286094 A1 | 11/2008 | Jain | |
| 2009/0003997 A1 | 1/2009 | Jain et al. | |
| 2009/0008508 A1 | 1/2009 | Jain et al. | |
| 2009/0121083 A1* | 5/2009 | Jain | 244/130 |

FOREIGN PATENT DOCUMENTS

| | | |
|---|---|---|
| EP | 0694740 | 1/1996 |
| EP | 1382379 | 1/2004 |
| FR | 980347 A | 5/1951 |
| GB | 1070458 | 6/1967 |
| GB | 1312619 | 4/1973 |
| GB | 1336724 | 11/1973 |
| GB | 1382809 | 2/1975 |

OTHER PUBLICATIONS

U.S. Appl. No. 11/584,030, filed Oct. 20, 2006—Morford, et al., entitled "Gas Turbine Engine Having Slim-Line Nacelle".
U.S. Appl. No. 11/749,260, filed May 16, 2007—Jain, et al.
U.S. Appl. No. 11/739,216, filed Apr. 24, 2007—Jain, et al.
U.S. Appl. No. 11/750,398, filed May 18, 2007—Jain, et al.
U.S. Appl. No. 11/772,287, filed Jul. 2, 2007—Jain, et al.
U.S. Appl. No. 11/769,749, filed Jun. 28, 2007—Jain, et al.
Extended European Search Report for Application No. 08252429.9 mailed Nov. 26, 2008.
Extended European Search Report for Application No. EP 07 25 4305 dated Aug. 19, 2011.
Extended European Search Report for Application No. EP 08 25 1047 dated Sep. 6, 2011.
Extended European Search Report for Application No. EP 08 25 3874.5 dated Jan. 25, 2012.

* cited by examiner

NACELLE ASSEMBLY HAVING INLET BLEED

BACKGROUND OF THE INVENTION

This invention relates to a nacelle assembly for a turbine engine, particularly for an aircraft.

For a gas turbine engine, such as a turbo fan engine, air is pressurized in a compressor and mixed with fuel in a combustor to generate hot combustion gases. These gases flow downstream through the turbine stages of the engine, which extract energy from the gases. In a two spool gas turbine engine, a high pressure turbine powers a high pressure compressor, while a low pressure turbine powers the fan section disposed upstream of the compressor and a low pressure compressor.

Combustion gases are discharged from the turbo fan engine through a core exhaust nozzle while fan air is discharged through an annular fan exhaust nozzle defined at least partially by a nacelle surrounding the core engine. A majority of the propulsion thrust is provided by the pressurized fan air, which is discharged through the fan exhaust nozzle. The remaining thrust is provided by the combustion gases discharged through the core exhaust nozzle.

It is known in the field of aircraft gas turbine engines that the performance of the turbo fan engine varies during diverse flight conditions experienced by the aircraft. An inlet lip section located at the foremost edge of the turbo fan nacelle is typically designed to enable operation of the turbo fan engine and prevent the separation of airflow from the inlet lip section of the nacelle during these diverse flight conditions. For example, the inlet lip section requires a "thick" inlet lip section designed to support operation of the turbo fan during specific flight conditions, such as cross-wind conditions, take-off and the like. Disadvantageously, the "thick" inlet lip section may reduce the efficiency of the turbo fan engine during cruise conditions of the aircraft, which conditions exist for the large majority of the flight of the aircraft.

A need therefore exists to optimize the performance of a turbo fan gas turbine engine during diverse flight conditions so as to reduce the nacelle thickness and its associated drag.

SUMMARY OF THE INVENTION

The present nacelle assembly for a turbine engine has a cowl. The cowl extends along an axis and has an exterior surface spaced from an interior surface. The interior surface forms an air inlet for directing airflow to the turbine engine. An opening is disposed on the cowl. A device for creating suction through the opening is in fluid communication with the opening. The opening removes a portion of a boundary layer flow through the cowl, thereby providing higher energy flow along the interior surface.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
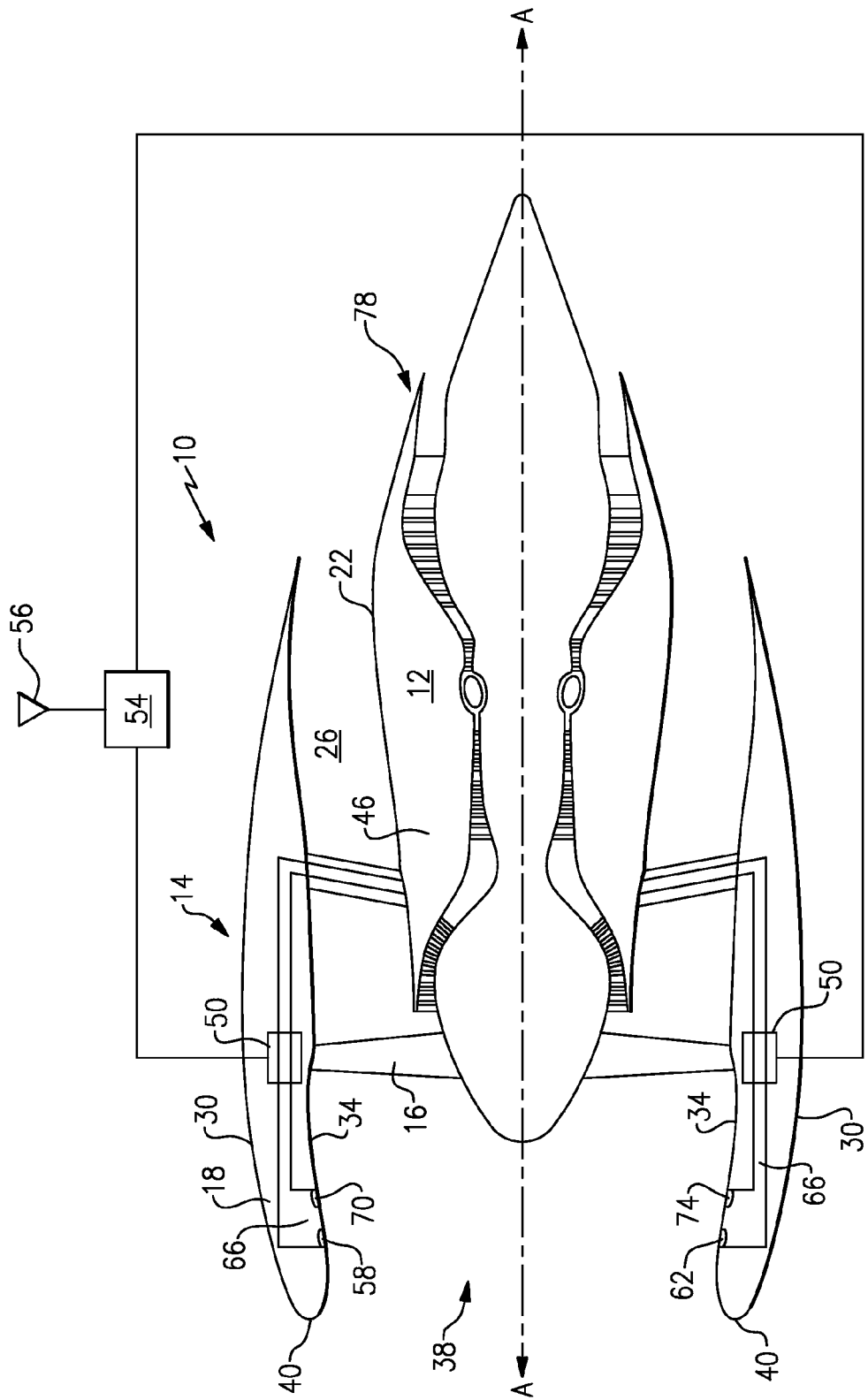
FIG. 1 illustrates a side cross-sectional view of a gas turbine engine, including the present nacelle.

With reference to FIG. 1, there is shown a cross-sectional view of a turbine engine assembly 10. Part of turbine engine assembly 10 is nacelle assembly 14. Nacelle assembly 14 has fan cowl 18 and is spaced from core cowl 22 of turbine engine 12 to form bypass flow passage 26. Fan 16 is driven by turbine engine 12 and passes primary thrust through bypass flow passage 26 as known.

Nacelle assembly 14 is disposed about axis A and has exterior surface 30 and interior surface 34. Exterior surface 30 and interior surface 34 form lip 40. Interior surface 34 further defines air inlet 38 that provides airflow to turbine engine 12 and fan 16.

With reference to FIG. 1, nacelle assembly 14 has first opening 58, second opening 62, third opening 70 and fourth opening 74. These openings 58, 62, 70 and 74 are disposed on interior surface 34 of fan cowl 18 as shown and are in fluid communication with flow volume 66. First opening 58 is spaced away from third opening 70 along axis A while second opening 62 is spaced along axis A upstream of fourth opening 74. In addition, first opening 58 is radially spaced from second opening 62 while third opening 70 is radially spaced from fourth opening 74. More or fewer openings can be provided either along axis A or circumferentially around axis A in rows or not in rows.

Flow volume 66 is further in fluid communication with device for creating suction 46, here a portion of turbine engine 12, having an anticipated lower air pressure than the air pressure around openings 58, 62, 70 and 74. Controlling fluid flow from device for creating suction 46 and openings 58, 62, 70 and 74 are valves 50. Valves 50 are controlled by control unit 54, which receives data from sensor 56. In addition, fluid flow through openings 58, 62, 70 and 74 are communicated through flow volume 66 and ultimately expelled out nozzle 78 of turbine engine 12. Although fluid flow is shown controlled by control unit 54 and valves 50, adequate suction can be created without the need for such a control.

Figure 2:
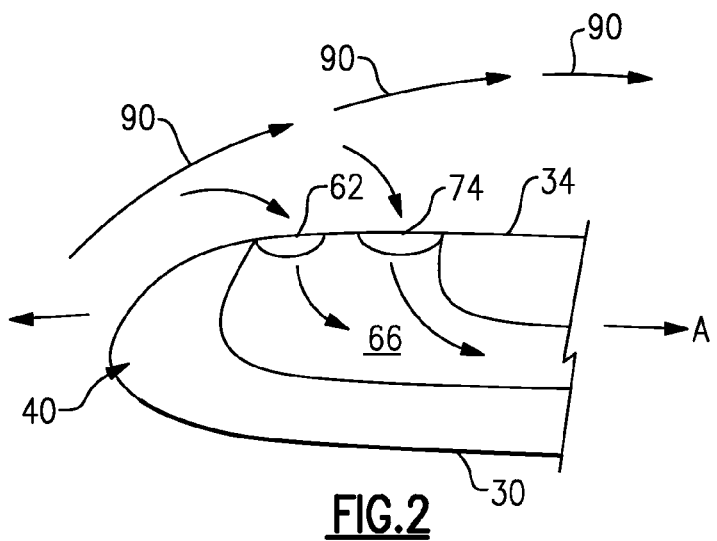
FIG. 2 illustrates a close up view of the nacelle assembly of FIG. 1, highlighting an opening on the interior surface.

With reference to FIG. 2, there is shown airflow 90, here a boundary layer flow, over lip 40 and across interior surface 34. When control unit 54 opens valve 50, suction is created at openings 58, 62, 70 and 74. Consequently, the low energy flow portion of airflow 90 will be drawn into second opening 62 and fourth opening 74, as shown, and into flow volume 66 and ultimately out nozzle 78. As a consequence of this action, this low energy boundary layer is removed. Airflow 90 will consequently be accelerated around lip 40 and across interior surface 34 of air inlet 38.

Suction at openings 58, 62, 70 and 74 occurs when control unit 54 through sensor 56 determines that the low energy boundary layer flow of airflow 90 needs to be removed, such that remaining airflow 90 can negotiate flow around lip 40 without major flow separation. Flow separation is likely to occur during static takeoff conditions, a crosswind condition, a climb condition or a windmill condition. During such conditions, control unit 54 controls valve 50 in such a way as to control the rate and level of suction at openings 58, 62, 70 and 74. Otherwise, control unit 54 may determine not to operate valve 50 and not allow for suction at openings 58, 62, 70 and 74, such as when the aircraft is in cruise condition.

As a consequence of the foregoing design, airflow 90 is energized at conditions when airflow about lip 40 and interior surface 34 need be sufficient for turbine engine 12. In this way, lip 40 and the overall thickness of nacelle assembly 14 may be reduced so as to optimize nacelle assembly 14 for cruise conditions, the majority of the flight conditions for turbine engine 12.

Figure 3:
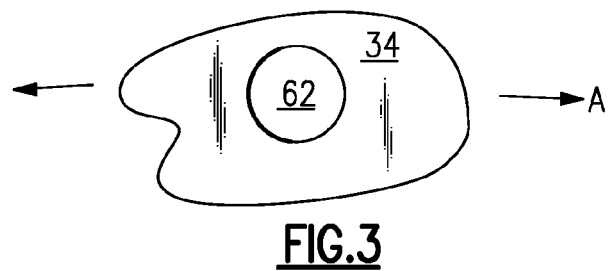
FIG. 3 illustrates a close up view of an opening on the interior surface of the nacelle assembly of FIGS. 1-2.
Figure 4:
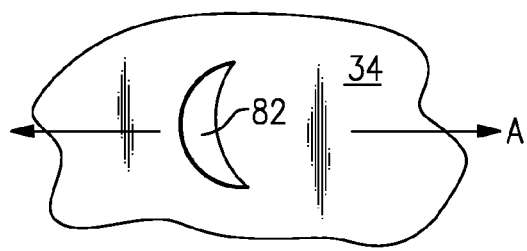
FIG. 4 illustrates an alternative design of an opening.
Figure 5:
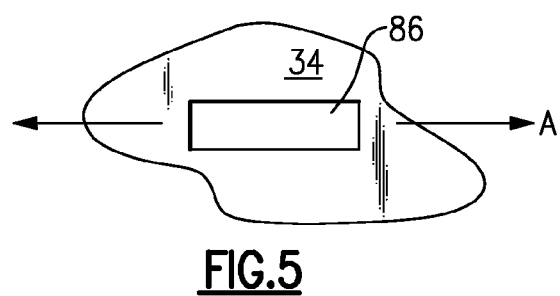
FIG. 5 illustrates another alternative design of an opening.

FIG. 3 illustrates opening in the form of a round hole. In addition, as shown in FIGS. 4 and 5, opening may have different shapes. For example, in FIG. 4, there is shown fifth opening 82 in the form of a crescent. In FIG. 5 there is shown sixth opening 86 in the form of a slot. In addition, other shapes are also contemplated.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

I claim:

1. A nacelle assembly for a turbine engine, comprising:
    a cowl for a turbine engine, said cowl extending along an axis and having an exterior surface spaced from an interior surface, said interior surface forming an air inlet for directing air flow to the turbine engine;
    an opening disposed on said cowl;
    a device for creating suction through said opening, said device for creating suction in fluid communication with said opening; and
    a valve disposed between said opening and said device for creating suction, said valve for controlling fluid flow through said opening.

2. The nacelle assembly of claim 1 wherein said opening is disposed on said interior surface.

3. The nacelle assembly of claim 1 wherein said valve is controlled by a control unit.

4. The nacelle assembly of claim 1 wherein said opening comprises a first opening and a second opening.

5. The nacelle assembly of claim 4 including a flow volume in communication with said first opening and said second opening and said device for creating suction.

6. The nacelle assembly of claim 4 wherein said first opening is spaced along said axis from said second opening.

7. The nacelle assembly of claim 4 wherein said first opening is spaced radially about said axis from said second opening.

8. The nacelle assembly of claim 1 wherein said device for suction is said turbine engine.

9. The nacelle assembly of claim 8 wherein said device for suction expels fluid flow through a nozzle of said turbine engine.

10. A turbine engine, comprising:
    a turbine engine extending along an axis;
    a fan cowl for a turbine engine, said fan cowl extending along an axis and having an exterior surface spaced from an interior surface, said interior surface forming an air inlet for directing air flow to the turbine engine;
    a core cowl extending at least partially about said turbine engine, said core cowl spaced from said fan cowl to form a bypass flow passage;
    an opening disposed on said interior surface; and
    a device for creating suction through said opening, said device for creating suction in fluid communication with said opening, wherein said device for suction is said turbine engine.

11. The nacelle assembly of claim 10 including a valve disposed between said opening and said device for creating suction, said valve for controlling fluid flow through said opening.

12. The nacelle assembly of claim 11 wherein said valve is controlled by a control unit.

13. The nacelle assembly of claim 10 wherein said opening comprises a first opening and a second opening.

14. The nacelle assembly of claim 13 including a flow volume in communication with said first opening and said second opening and said device for creating suction.

15. The nacelle assembly of claim 13 wherein said first opening is spaced along said axis from said second opening.

16. The nacelle assembly of claim 13 wherein said first opening is spaced radially about said axis from said second opening.

17. The nacelle assembly of claim 10 wherein said device for suction expels fluid flow through a nozzle of said turbine engine.

* * * * *